Dec. 20, 1966 N. N. P. SMITH 3,293,360
TELEVISION EQUIPMENT FOR MOBILE CRAFT
Filed April 13, 1964
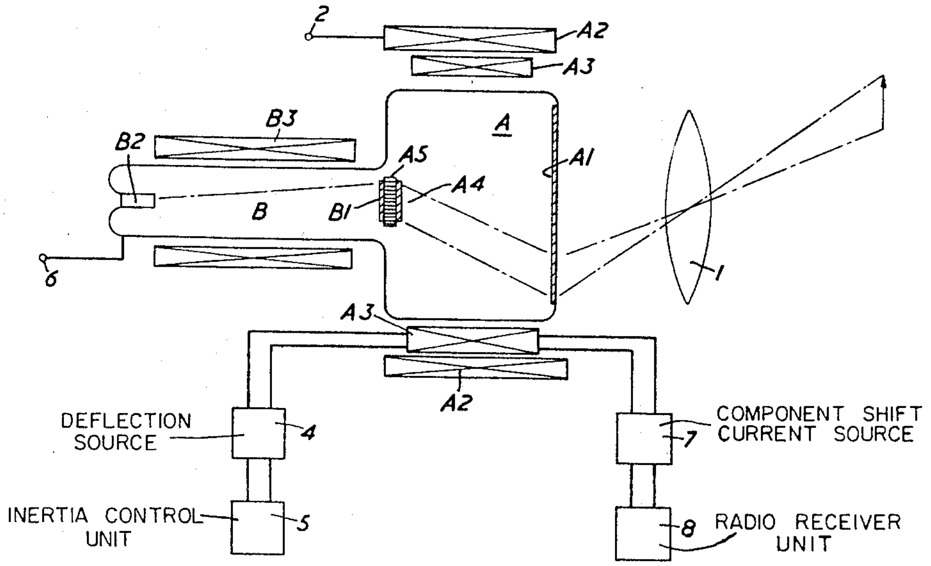
INVENTOR
Norman Neville Parker Smith
BY
Baldwin & Wight
ATTORNEY

United States Patent Office 3,293,360

Patented Dec. 20, 1966

3,293,360

TELEVISION EQUIPMENT FOR MOBILE CRAFT

Norman Neville Parker Smith, Billericay, England, assignor to The Marconi Company Limited, London, England, a British company Filed Apr. 13, 1964, Ser. No. 359,517

Claims priority, application Great Britain, Apr. 17, 1963, 15,210/63

8 Claims. (Cl. 178—6.8)

This invention relates to television equipment for mobile craft and though not limited to use in mobile craft constituted by missiles, is particularly advantageous for and is primarily intended to solve certain difficult problems which arise when television equipment is fitted to a missile.

An expedient which may be used to assist control of a guided missile is to put in the nose thereof a television camera tube which "looks" forward in the direction of flight of the missile, or at an angle thereto—this angle may be, in some cases, arranged to be controllable by radio from the ground—and produces video signals which are fed to a radio transmitter which is carried in the missile and accordingly transmits a television picture as "seen" by the camera tube back to the ground. This picture, reproduced at the ground control station, gives the controlling officer useful information on which to base radio control of the missile; thus, for example, if the picture shows that the desired target appears to be successfully avoiding the missile the controller can operate known radio missile guidance control means to change the course of the missile to follow the target.

Mobile craft television equipment as at present proposed for purposes such as the foregoing presents quite serious operating difficulties due to the fact that in practice a missile does not remain in a constant attitude while proceeding along its track but will make considerable changes in attitude—for example will yaw or pitch in flight. A fixed camera tube or one which is fixed except that it can be angled in relation to the missile by radio control from the ground will not, therefore, always "look" in the fixed or adjusted direction and the direction of "observation" by the camera will shift undesirably with changes of attitude of the missile—sometimes quite quickly and over relatively large angles. The result is that not only will the camera at times "look" in the wrong direction but it is liable to swing rapidly through the desired direction and therefore produce a blurred and unclear picture. While it is possible, theoretically, to overcome this difficulty by mounting the camera tube on a gyroscopically or inertia stabilised platform or to arrange it to "see" it view a mirror or other optical system mounted on such a platform, this solution of the problem is not a very practical one for a missile because of the size and weight of the mechanical stabilising mechanism required and, of course, the accommodation available for such mechanism in a missile is seriously limited.

Other expedients have therefore been sought to overcome the difficulty. One such expedient consists in using a camera tube which is fixed in relation to the missile and arranging the optical system which presents the view to be televised to the camera tube to make that view, as presented, cover only a fraction of the whole available picture receiving area of the camera tube. If, therefore, the scanning raster in said camera tube is arranged to cover only the smaller, fractional area, and the scanning deflecting forces applied to produce the scanning raster are arranged to include gyroscopically or similarly controlled shift deflection forces so that the raster automatically follows the said small fractional area, the camera tube will always "look" in the same direction even if the missile attitude changes, such changes causing the view presented to the camera tube to move about on its picture receiving area, being always followed by and covered by the correspondingly shifted scanning raster. This expedient will work so long as the changes of attitude of the missile are not enough to bring the small view presented to the camera tube off the picture receiving area thereof altogether—in other words so long as said area is sufficiently large, relative to the area of the small view presented, to accommodate all changes in missile attitude which occur.

It still has, however, two important defects. The first of these defects is that it requires that the view presented to the camera tube must be substantially smaller than the picture receiving area thereof and this involves inefficient use of the camera tube, loss of resolution and other disadvantages—for example, with a normal camera tube of, say, the Vidicon or image orthicon type, areas of the target structure which have not been scanned for some time will acquire charges and there will be transitional blurring effects if the view presented then moves into such areas. Also, though this is perhaps not of much importance in practice, in the case of a missile installation, if the view presented stays more or less in one place on the picture receiving area of the tube, there is a liability for selective scan burn to occur. The second of the two defects above referred to is inherent in the fact that the small view presented to the picture receiving area of the tube moves about thereon, perhaps quite rapidly at times, and known camera tubes have quite substantial storage effects. Accordingly there will be substantial movement blurring of the picture as televised, the more rapid the movement and the greater the storage effect, the more the blurring.

According to this invention a television equipment for a missile or other mobile craft comprises means for projecting on to a photo-sensitive cathode a first light image of a view to be televised, said image being small relative to the area of said cathode, means for developing from the resultant electron emission from said first image on said cathode, a second light image, means automatically controlled in response to changes of attitude of the craft, for controlling the direction of the said resultant electron emission in such manner that the position of said second image remains substantially unaffected by changes of the position of the first image on said cathode, a camera tube electrode system of the storage type including a picture receiving area and scanning means for developing video signals corresponding to light images on said area, and means for producing on said picture receiving area a light image corresponding to said second image and occupying at least approximately the whole of said picture receiving area.

Preferably the light image produced on the picture receiving area of the camera tube electrode system is the actual second light image though it is possible to provide optical means for projecting the second image on to the picture receiving area of the camera tube electrode system with a change of size and/or shape so long as the projected image occupies approximately the whole of the said picture receiving area.

In one way of carrying out the invention there is provided in combination a camera tube, an image intensifier tube having a photo-cathode and a fluorescent screen, optical means for projecting a first light image on to the cathode of said image intensifier tube to occupy only a fraction of the area of said photo-cathode, means controlled in dependence upon changes of attitude of the craft for causing electron emission produced by the first light image from the photo-cathode to produce on the fluorescent screen of the image intensifier tube a corresponding second light image the position of which is substantially the same irrespective of the position of the first light image on the photo-cathode and means for projecting the image on the fluorescent screen on to the picture receiving area of the camera tube so as approximately to fill the same.

The camera tube and the image intensifier tube may be in effect combined in a single combined tube structure. Thus, for example, there may be a combined tube structure having a large photo-cathode at one end and housing a smaller fluorescent screen lying parallel to the photo-cathode and forming part of a unitary structure having a fluorescent layer on the side towards the photo-cathode and a photo-conductive layer constituting the scanned target area of a Vidicon type of camera tube electrode system on the other side, light from the fluorescent layer activating the photo-conductive layer. Between the two layers may be a so-called fibre-optic plate for passing the light. Fibre-optic plates are, of course, known per se and consist in effect of a multitude of tiny, total internally reflecting, parallel light tubes.

Control of the direction of the electron emission from the photo-cathode to ensure that the emission caused by the first light image thereon always falls in a relatively fixed position on the fluorescent screen, irrespective of the position of said first light image on the photo-cathode, may be effected by an electro-magnetic deflection coil system around the space between the photo-cathode and the fluorescent screen, the deflecting currents to the coil system being controlled in dependence upon attitude changes of the mobile craft by gyroscopic or other inertia means which may be as known per se and form per se no part of this invention. Therefore, although gyroscopic or other inertia means are still employed in carrying out this invention they do not have to control the positions of any mechanically moving bodies but only have to effect control of electrical or magnetic deflection forces and may therefore be made relatively small and of high operating accuracy. Because the picture receiving surface of the camera tube electrode system is substantially fully occupied by a light image the said system is efficiently employed and good resolution, high sensitivity and a minimum of localised burning effects are obtainable. Furthermore, because the image on the said picture receiving surface does not move relative thereto with changes in attitude of the craft, storage effects in the camera tube electrode system do not produce movement blurring. Although the first light image on the photo cathode of the image intensifier part of the apparatus is much smaller than said cathode and moves about thereon with changes of attitude of the craft, so that it may be said that this part of the apparatus is not fully used, this fact is not of practical significance, while, because the image intensifier part of the apparatus has very little—indeed negligible—storage effect, the movement in question does not cause appreciable movement blurring of the resultant televised picture.

If it is desired to control the direction in which the equipment "looks" this may be done by superimposing appropriate shift currents on the attitude controlled deflection currents supplied to the deflection system between the photo-cathode receiving the first light image and the fluorescent screen producing the second light image, and controlling the superimposed shift currents by radio as known per se.

The expression "changes of attitude" and similar expressions are employed herein to mean changes due to motions of a pitching, yawing or similar nature as distinct from purely rolling motions, i.e. rotation of a missile about its own axis. Although the invention may be carried out in such manner as to take into account rolling motions also—it is obviously only a matter of appropriate control of the deflecting forces applied to the electron flow between the first and second light images—correction for roll does not, as a rule present a major problem since the power required to stabilise a complete camera against roll by rotating it about its optical axis is relatively small. It may therefore be found more convenient rotatably to mount an apparatus in accordance with this invention under gyroscopic, pendulum or other inertia control (or to present it with the first light image via a similarly controlled rotatable mirror or other optical system) rather than to correct for roll by superimposing roll-compensating deflection components on the deflection system between the first and second light images.

The invention is obviously not limited exclusively to its application to missiles but is applicable to moving craft generally, e.g. marine craft. In general however the limitations as to weight and size of apparatus in marine craft are so much less onerous than in missiles that it may well be preferred, in such craft, to mount a television camera on a mechanically stabilised platform or present it with its images via a mechanically stabilised optical system in the known manner.

Although any type of camera tube or camera tube electrode system may be employed in carrying out this invention the Vidicon type is at present preferred rather than, say, the image orthicon type because of its ruggedness, simplicity and wide range of utilisable light levels.

The invention is illustrated in the accompanying drawing which is a highly simplified schematic block diagram of one embodiment.

Referring to the drawing the tube employed, which is purely schematically indicated, may be regarded as a combined image intensifier tube and Vidicon camera tube. The image intensifier section is generally designated A and the camera section is generally designated B. On the inside of the end wall of the section A is a photo-cathode A1 upon which a first light image is focussed by a suitable optical system 1 represented simply by a lens. The lens has a pre-determined wide angle of view which is symmetrical about the axis and the image it focusses on the cathode A1 is of considerably smaller dimensions than the cathode itself—in the case indicated in the figure, of rather less than a quarter of the dimensions of the cathode. Accordingly an image of any object (represented by the arrow) appearing anywhere in the field of view of the optical system 1 will be focussed somewhere on the cathode A1, the position of the image on the cathode being governed by the position of the object in the field of view. If, for the moment, it is assumed that the tube is set to "look" directly forward along the missile axis when the attitude of the missile is such that its axis is in the direction of flight, the first image will, when this attitude is assumed, be central on the cathode A1. The figure is drawn to show the case when the attitude is near the limit of inclination to the direction of flight so that the arrow is well offset to one side and the first image is near one edge of the cathode A1.

Around the section A are two coil systems A2, A3 of which A2 is a normal focussing coil system and A3 is a deflecting coil system. The system A2 is fed with focussing current at terminal 2 from a focussing current source (not shown) in the normal way and the system A3 is fed with mutually perpendicularly component deflecting currents from a deflection source 4 controlled by an attitude responsive inertia control unit 5 which forms per se no part of this invention and may be of any known suitable type and construction, e.g. gyroscopic. The arrangement is such that, irrespective of the position of the first light image on the cathode A1, the emission therefrom falls always on a fluorescent screen A4 to produce a corresponding second light image by electron bombardment thereof. It is presumed that roll correction is obtained by mounting the whole tube to be rotatable, under gyroscopic control, about the axis so that the light images do not move relative to the surfaces on which they appear as a result of rolling movements alone. This gyroscopically controlled rotatable mounting is not shown in the figure. The screen A4 is a phosphor layer on one side of a fibre optic plate A5 on the other side of which is a photo-conductive layer B1. The second light image passes through this plate on to the layer B1 the area and shape of which correspond substantially with the area and shape of the layer A4 and of the second image. A charge image accordingly appears on the layer B1 and this is scanned in a television line raster by a scanning ray from a gun indicated at B2 to develop video signals in the ordinary way. These signals appear at terminal 6 and are transmitted by a radio transmitter (not shown). B3 represents the usual focussing and deflecting coil system for the camera tube section of the tube.

The figure also shows means, which may be provided if required, for radio control of the direction in which the tube "looks" relative to the direction of missile flight when the attitude of the missile is such that its axis is along the line of flight. These means comprise a component shift current source 7 providing mutually perpendicular shift current components which are fed to the coil system A3 and are controlled by a controlling radio receiver unit 8. This unit 8 forms per se no part of this invention and may be of any known suitable construction and arrangement.

I claim:

1. A television equipment for a missile or other mobile craft comprising means for projecting on to a photosensitive cathode a first light image of a view to be televised, said image being small relative to the area of said cathode, means for developing from the resultant electron emission from said first image on said cathode, a second light image, means automatically controlled in response to changes of attitude of the craft, for controlling the direction of the said resultant electron emission in such manner that the position of said second image remains substantially unaffected by changes of the position of the first image on said cathode, a camera tube electrode system of the storage type including a picture receiving area and scanning means for developing video signals corresponding to light images on said area, and means for producing on said picture receiving area a light image corresponding to said second image and occupying at least approximately the whole of said picture receiving area.

2. An equipment as claimed in claim 1 wherein the light image produced on the picture receiving area of the camera tube electrode system is the actual second light image.

3. An equipment as claimed in claim 1 and comprising optical means for projecting the second image on to the picture receiving area of the camera tube electrode system with a change of size and in such manner that the projected image occupies approximately the whole of the said picture receiving area.

4. A television equipment for a missile or other mobile craft comprising a camera tube, an image intensifier tube having a photo-cathode and a fluorescent screen, optical means for projecting a first light image on to the cathode of said image intensifier tube to occupy only a fraction of the area of said photo-cathode, means controlled in dependence upon changes of attitude of the craft for causing electron emission produced by the first light image from the photo-cathode to produce on the fluorescent screen of the image intensifier tube a corresponding second light image the position of which is substantially the same irrespective of the position of the first light image on the photo-cathode and means for projecting the image on the fluorescent screen on to the picture receiving area of the camera tube so as approximately to fill the same.

5. An equipment as claimed in claim 4 wherein the camera tube and the image intensifier tube are in effect combined in a single combined tube structure.

6. An equipment as claimed in claim 5 wherein there is a combined tube structure having a large photo-cathode at one end and housing a smaller fluorescent screen lying parallel to the photo-cathode and forming part of a unitary structure having a fluorescent layer on the side towards the photo-cathode and a photo-conductive layer constituting the scanned target area of a Vidicon type of camera tube electrode system on the other side, light from the fluorescent layer activating the photo-conductive layer.

7. An equipment as claimed in claim 4 wherein control of the direction of the electron emission from the photo-cathode to ensure that the emission caused by the first light image thereon always falls in a relatively fixed position on the fluorescent screen, irrespective of the position of said first light image on the photo-cathode is effected by an electro-magnetic deflection coil system around the space between the photo-cathode and the fluorescent screen, the deflecting currents to the coil system being controlled in dependence upon attitude changes of the mobile craft.

8. An equipment as claimed in claim 4 wherein means are provided for effecting control of the direction in which the equipment "looks" by superimposing appropriate shift currents on the attitude controlled deflection currents supplied to the deflection system between the photo-cathode receiving the first light image and the fluorescent screen producing the second light image, and controlling the superimposed shift currents by radio.

References Cited by the Examiner

UNITED STATES PATENTS

| | | | |
|---|---|---|---|
| 2,792,190 | 5/1957 | Seibold | 244—14.3 |
| 2,892,949 | 6/1959 | Hardy. | |
| 3,046,332 | 7/1962 | Engler | 178—6.8 |

DAVID G. REDINBAUGH, *Primary Examiner.*

KATHLEEN CLAFFY, *Examiner.*

J. A. ORSINO, *Assistant Examiner.*